United States Patent Office 3,041,371
Patented June 26, 1962

3,041,371
PRODUCTION OF ACRYLIC AND METHACRYLIC ESTERS OF POLYOXYALKYLENE COMPOUNDS
William F. Goldsmith, South Charleston, Russell C. Lemon, Scott Depot, and Amelio E. Montagna, South Charleston, W. Va., assignors to Union Carbide Corporation, a corporation of New York
No Drawing. Filed Nov. 3, 1959, Ser. No. 850,518
7 Claims. (Cl. 260—486)

This invention relates to organic processes and in particular, to an improved process for the production of unsaturated aliphatic esters of polyoxyalkylene compounds. The invention is especially concerned with the preparation of difunctional acrylic and methacrylic esters of polyoxyalkylene glycols and related monofunctional acrylic and methacrylic esters of polyoxyalkylene glycol monoalkyl ethers.

Acrylic and methacrylic esters of polyoxyalkylene glycols and polyoxyalkylene glycol monoalkyl ethers, in general, are well known to the art, and find suitable utilization in a number of diverse applications. By way of brief illustration, such compounds have satisfactorily been employed as textile modifying agents and lubricants, and in the manufacture of vinyl resin plastisols, plastic foams, films, coating agents, etc., and the like.

Conventional processes for the production of these esters usually involve the direct esterification of acrylic or methacrylic acid, acid anhydride, or acid halides, with a polyoxyalkylene glycol or monoalkyl ether thereof. Unfortunately, however, in such conventional processes varying amounts of polymeric materials are ordinarily obtained as by-products along with the ester. These by-products are generally polymers of either the unsaturated reactant, the ester product itself, or both.

Disadvantageously, polymerization of this nature frequently engenders an appreciable reduction in both the yield and quality of the ester product. The lowered yields are due in part to the incomplete esterification that usually occurs as a result of such polymer formation. In addition, the presence of unreacted, water-soluble polyoxyalkylene glycol or polyoxyalkylene glycol monoalkyl ether tends to increase the water solubility of the ester product. Reductions in yield thereby accrue during the subsequent aqueous washing procedures commonly employed in recovering the prepared ester. Moreover, the polymeric by-products often form stable emulsions upon neutralization of excess acid in the crude reaction product. The subsequent use of additional separation techniques in order to purify and recover the ester product therefore becomes necessary. These conventional processes for the production of acrylic and methacrylic esters of polyoxyalkylene glycols and monoalkyl ethers thereof consequently represent inconvenient and time-consuming operations.

The disadvantages of the prior art hereinabove described can now be overcome substantially through the practice of the present invention, which, in its broadest aspect, depends upon the discovery that acrylic and methacrylic diesters of polyoxyalkylene glycols and related acrylic and methacrylic monoesters of polyoxyalkylene glycol monoalkyl ethers can be produced with greatly reduced accompanying polymer formation by the direct esterification of acrylic or methacrylic acid, acid anhydride, or acid halides, with a polyoxyalkylene compound which has initially been stabilized against oxidative decomposition or degradation. More particularly, the polyoxyalkylene compounds utilized as reactants in accordance with the process of this invention are polyoxyalkylene glycols and polyoxyalkylene glycol monoalkyl ethers having incorporated therein during the course of their production stabilizing quantities of specific alkylated or alkoxylated phenols. Advantageously, upon the subsequent reaction of these stabilized polyoxyalkylene compounds with acrylic or methacrylic acid, acid anhydride or acid halides, high conversions of the reactants to the desired ester products are obtained. Improved ester yields over those ordinarily produced by conventional processes can accordingly be realized. Moreover, the formation of stable polymer emulsions upon neutralization of excess acid in the crude reaction product is also greatly reduced. A simplification of the purification and recovery procedures necessary to separate the ester product is therefore possible. In addition, the ester products of this invention are generally lighter in color than similar ester products heretofore obtained by conventional processes. Thus they are more suitable for end uses such as plastic foams, films, etc., wherein lightness of product color is important.

The stabilized polyoxyalkylene compounds to be employed as reactants in the process of this invention are initially prepared in accordance with co-pending application Serial No. 671,132, filed July 11, 1957, now U.S. Patent No. 2,942,033, wherein at least one 1,2-alkylene oxide such as ethylene oxide, 1,2-propylene oxide, and 1,2-butylene oxide, etc., is condensed with either water, an alkyl monohydroxy alcohol, an alkylene glycol, dialkylene glycol or trialkylene glycol. Typical of the polyoxyalkylene glycols suitable for use in the process of this invention are the polyoxyethylene glycols prepared by the addition of ethylene oxide to water, ethylene glycol, or diethylene glycol; polyoxypropylene glycols prepared by the addition of 1,2-propylene oxide to either water, propylene glycol or dipropylene glycol; and mixed oxyethylene-oxypropylene polyglycols prepared in similar manner, utilizing a mixture or sequential addition of ethylene oxide and 1,2-propylene oxide. Polyoxyalkylene glycol monoalkyl ethers which can satisfactorily be employed in the present invention are of the type described in U.S. 2,213,477, 2,448,664, 2,425,755 and 2,677,700, prepared by the reaction of a 1,2-alkylene oxide, such as ethylene oxide and 1,2-propylene oxide, mixtures thereof, or ethylene oxide and 1,2-propylene oxide sequentially, to an alkyl monohydroxy alcohol.

The specific alkylated or alkoxylated phenols used to stabilize the polyoxyalkylene compounds can be represented by the formula:

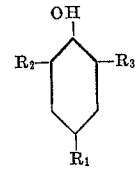

wherein $R_1$ designates hydrogen or an alkyl or alkoxy radical; and $R_2$ and $R_3$ are such that when $R_1$ is a hydrogen or alkyl radical, $R_2$ and $R_3$ each designate either hydrogen or alkyl radicals, at least one of which is an alkyl radical; and when $R_1$ is an alkoxy radical, $R_2$ and $R_3$ each designate either hydrogen or alkyl radicals without limitation. The alkyl radicals designated by $R_1$, $R_2$ and $R_3$ can be either primary, secondary, or tertiary alkyl radicals and are preferably lower alkyl radicals possessing from one to about four carbon atoms. Illustrative examples of the stabilizers are 2,6-ditertiary-butyl-para-cresol, para-hydroxyanisole, 2,6-ditertiarybutyl phenol, 2-tertiarybutyl-para-cresol, 2-butyl-para-hydroxyanisole, 2,6-dibutyl-para-hydroxyanisole and 2,6-dimethyl-para-cresol, etc.

In the preparation of the stabilized polyoxyalkylene compounds, a 1,2-alkylene oxide and either water, an alkyl monohydroxy alcohol, an alkylene glycol, dialkylene glycol or trialkylene glycol are initially condensed in the presence of an alkaline catalyst, such as an alkali metal hydroxide or alcoholate, according to standard processes for the production of polyoxyalkylene compounds. The stabilizer is subsequently dissolved in the crude reaction product upon completion of the condensation reaction and during or immediately following the neutralization of the alkaline catalyst. Desirably, an inert (oxygen-free) atmosphere, such as nitrogen or argon, is maintained in the reaction system at least until the addition of stabilizer is complete, and preferably until the final product is isolated. The occurrence of unwanted side reactions is thereby minimized.

Neutralization of the alkaline catalyst is conventionally achieved by the suitable addition of acid, such as phosphoric acid, concentrated sulfuric acid or concentrated hydrochloric acid, to the crude reaction product. However, any other convenient method for removing the alkaline catalyst and reducing the pH of the crude reaction product can also be employed. Of prime importance to the stabilization of the polyoxyalkylene compounds is the introduction of stabilizer after the pH of the crude reaction product has been adjusted, as for example, by the addition of acid, to within a range of from approximately 6 to 11. The term "pH," as employed herein, designates a value taken to represent the acidity or alkalinity of the crude reaction product, generally determined by measuring the pH of a five percent by weight mixture or solution of the crude reaction product with water, and is defined as the logarithm of the reciprocal of the hydrogen-ion concentration. The addition of acid, for example, therefore serves to lower the pH of the crude reaction product. Preferably the stabilizer is added when the pH of the crude reaction product has been adjusted to within a range of from approximately 7 to 8. Optimum results can thereby be achieved.

It is essential that no significant time lapse occur between the complete neutralization of the alkaline catalyst, i.e. the adjustment of the pH of the crude reaction product to a value of 7 or less, and the subsequent addition of stabilizer, since the existence of unstabilized material in a neutral or acidic medium (at a pH of 7 or less) for a prolonged period of time serves generally to impair the effectiveness of stabilization. When it is desired to add the stabilizer to the crude reaction product at a pH of about 7, or less, the stabilizer should accordingly be introduced within not more than about one hour after neutralization. The addition of stabilizer within periods of less than 30 minutes after neutralization is preferred in order to achieve maximum stability. It has been observed in this respect that the polyoxyalkylene compounds obtained by the addition of stabilizer to the crude reaction product at a time substantially more than one hour after neutralization have not been found to engender greatly reduced polymer formation when esterified with acrylic or methacrylic acid, acid anhydride or acid halides.

The stabilizer can be added to the crude reaction product as a solid, soluble compound, or as a solution in which the stabilizer is dissolved in a polyoxyalkylene glycol, an alcohol or any other non-reactive organic solvent. Preferably, the stabilizer is added to the crude reaction product in a concentration of from about 100 to 5,000 parts of stabilizer per million parts of polyoxyalkylene compound by weight. This concentration requirement is not narrowly limited, however, and any concentration of above approximately 10 parts of stabilizer per million parts of polyoxyalkylene compound by weight can be employed with satisfactory results. The use of concentrations below approximately 10 parts of stabilizer per million parts of polyoxyalkylene compound by weight is generally not effective in stabilizing the polyoxyalkylene compound; while no commensurate advantage may be gained by an increase in stabilizer concentration above approximately 5,000 parts of stabilizer per million parts of polyoxyalkylene compound by weight.

The addition of stabilizer can be carried out at any temperature within a range of from about the melting point of the polyoxyalkylene compound to 150° C. Especially good results may be obtained by the addition of stabilizer at a temperature of from 60° C. to 90° C. At temperatures above approximately 150° C., however, the disadvantage of increasing thermal decomposition of the polyoxyalkylene compound unfortunately overcomes the advantage of stabilization that is afforded.

When the addition or dissolution of stabilizer is complete, the pH of the crude reaction product is adjusted to a final, desired level in accordance with standard processes for the production of polyoxyalkylene compounds. Generally this final pH value is within a range of from approximately 6 to 7. The polyoxyalkylene product incorporating the dissolved stabilizer can then be recovered by any convenient method, such as filtration.

In an embodiment of the present invention, the stabilized polyoxyalkylene compound obtained as described above is changed to a suitable reactor, made, for example, of amber glass or stainless steel. To this charge a solvent or entrainer is generally added in order to facilitate the subsequent removal of the water of esterification and, in addition, to act as a reaction temperature depressant. Good results have been obtained by the utilization of toluene as the solvent or entrainer, and in particular, by the use of a mixture comprising about 70 parts of toluene to 30 parts of heptane by weight. Illustrative of compounds which may similarly be employed are benzene, cyclohexane, isopropyl ether and other non-reactive organic solvents. The solvent or entrainer is preferably introduced in concentrations of from about 40 to 60 percent by weight of the total reactants employed, although these limits are not narrowly critical. Greater or lesser amounts can accordingly be added with satisfactory effect.

In a preferred embodiment of this invention a polymerization inhibitor is also included in the initial charge to the reactor, although the use of such inhibitor is not essential to the invention. Among such compounds suitable for use in this connection are hydroquinone, copper powder, cupric salts of inorganic and organic acids, cupric salt chelates, and the specific alkylated or alkoxylated phenols used in stabilizing the polyoxyalkylene glycol or polyoxyalkylene glycol monoalkyl ether reactant, e.g., 2,6-ditertiarybutyl-para-cresol, para-hydroxyanisole, etc. Preferably, the polymerization inhibitor is added in a concentration of from about 0.1 to 1.0 percent by weight of the total reactants employed. However, greater or lesser quantities can also be added with beneficial results.

Heretofore, certain polymerization inhibitors such as hydroquinone, copper powder and other copper salts have been utilized in conventional processes for the production of acrylic and methacrylic esters of polyoxyalkylene glycols and polyoxyalkylene glycol monoalkyl ethers, without, however, adequate minimization of polymer formation. Similarly, the addition of the alkylated or alkoxylated phenols described above to the esterification reaction mixture in which a commercially available polyoxyalkylene compound is incorporated as a reactant has not been found to minimize adequately the formation of polymer. In such conventional processes, considerable effort still must be directed toward coping with the presence of the polymeric by-products. The use of stabilized polyoxyalkylene compounds as herein prescribed advantageously reduces the amount of polymerization that occurs during esterification, thereby improving the product yield. Moreover, by the conjunctive utilization of stabilized polyoxyalkylene compounds and a polymerization inhibitor as mentioned above, polymer formation may now be substantially eliminated. Improved product yields as high as 90 percent or more based upon the stabilized polyoxyalkylene compound may accordingly be expected.

After the addition of solvent and polymerization inhibitor to the reactor, the charge is agitated by suitable means and an esterification catalyst subsequently admixed therewith. Satisfactory esterification catalysts include sulfuric acid, benzenesulfonic acid, toluene sulfonic acid, etc. and the like. Preferably the catalyst is added in a concentration of from about 0.5 to 0.7 percent by weight of the total reactants. Concentrations of less than about 0.1 percent by weight of the total reactants, however, were found to engender excessively slow reaction rates, while the use of concentrations greater than approximately 3 percent by weight of the total reactants frequently engendered the formation of undesirable tars in the crude reaction product. The addition of catalyst to the charge in the reactor is generally made dropwise with continual stirring in order to prevent charring of the various components of the charge.

The charge is then heated to refluxing temperatures, preferably from about 100° C. to 110° C., and acrylic or methacrylic acid, acid anhydride, or acid halides such as acrylic or methacrylic chloride, added thereto with continued agitation. The employment of refluxing temperatures below about 100° C. necessitated long periods of time to attain substantial conversions, while the use of temperatures above approximately 120° C. resulted in the production of esters possessing undesirably high product color. The reaction temperature may in part be controlled by the selection of solvent or entrainer with which water of esterification is subsequently removed as a constant boiling mixture, or by a control of pressure within the reactor. Operating under reduced pressures, however, it is generally desirable to introduce a small amount of oxygen to the reaction mixture when hydroquinone is employed as a polymerization inhibitor. A maximum inhibiting effect is thereby achieved.

The acrylic or methacrylic acid, acid anhydride, or acid halide is preferably added in a slight excess of the stoichiometric amount necessary to react with the stabilized polyoxyalkylene compound. For example, in reactions between acrylic or methacrylic acid and a stabilized polyoxyalkylene glycol, resulting in the production of a difunctional ester, a molar ratio of approximately 2.2 moles of the acid to 1.0 mole of the glycol is preferred. No commensurate advantage accrues from the use of greater quantities of acid than those indicated. The use of lesser amounts, however, ultimately results in the incomplete esterification of the glycol to the difunctional ester product, and in addition results in production of the monofunctional acrylic or methacrylic halfester of the glycol. Often, this latter side-product, along with unreacted glycol, further serves to reduce the yield of the desired ester by increasing the solubility of the product in water. Product losses may then occur during subsequent aqueous washes. In similar manner, reactions between acrylic or methacrylic acid and a stabilized polyoxyalkylene glycol monoalkyl ether, resulting in the production of a monofunctional ester, are performed preferably utilizing a molar ratio of approximately 1.1 moles of the acid to 1.0 mole of the glycol monoether.

Best results have been obtained when the acrylic or methacrylic acid, acid anhydride, or acid halide is slowly added to the reactor, preferably over a period of from about one to four hours. Also of importance to the process is the continued agitation of the reaction mixture during this addition in order to attain high reaction rates. At the same time, water of esterification is removed continually as the aqueous layer of a binary constant boiling mixture with the solvent or entraining agent. The reaction is continued until the theoretical amount of water of esterification is collected, and until the conversion of the stabilized polyoxyalkylene compound to the desired ester product is complete, as indicated by analysis of the crude reaction product.

The crude reaction product is then neutralized and washed by any suitable means. Good results have been obtained, for example, by cooling the crude reaction product to a temperature of approximately 35° C. or less, and adding thereto an excess of 10 to 20 percent aqueous sodium hydroxide. Sodium carbonate, sodium acetate, or other alkaline materials may also be employed to neutralize the crude reaction product. The neutralized product is subsequently washed with water in order to remove any traces of alkali, as well as entrained color that may result from the reaction of alkali with the polymerization inhibitor. In the case of more soluble ester products, however, this subsequent washing procedure may be omitted.

It is generally desirable to re-inhibit the crude reaction product at this point, since the polymerization inhibitor previously used is usually destroyed or lost during neutralization and washing procedures. A polymerization inhibitor, such as hydroquinone or any of the others heretofore mentioned, is therefore added to the crude reaction product, preferably in a concentration of from about 0.05 to 0.1 percent by weight based upon the ester. The solvent or entraining agent is then removed from the crude product by any convenient method, such as flash evaporation or distillation at reduced pressure, and the desired ester product thereby obtained.

The process of the invention may be modified or varied by carrying out the esterification reaction as a continuous process, utilizing the same reactants. In addition the acrylic or methacrylic acid, acid anhydride, or acid halide may be substituted for by an acrylic or methacrylic ester.

The following examples serve to illustrate both the principles and practice of the present invention.

*Example I*

Two hundred grams of a stabilized polyoxyethylene glycol product having an average molecular weight of about 200 and incorporating approximately 0.02 gram of 2,6-ditertiarybutyl-para-cresol, was initially charged to a stainless steel reactor. The polyoxyethylene glycol product was produced by the condensation of ethylene oxide with ethylene glycol in the presence of a catalytic amount of sodium hydroxide and by the subsequent incorporation of the 2,6-ditertiarybutyl-para-cresol in the crude polyoxyethylene glycol reaction product prior to the complete neutralization thereof at a pH of between about 7 and 8. To the charge 530 grams of toluene, 228 grams of heptane and 7 grams of hydroquinone were added. Agitation was applied and 9 grams of sulfuric acid then added dropwise. The mixture was brought to reflux and 191 grams of methacrylic acid slowly added to the refluxing mixture over a period of several hours with continued agitation. The esterification reaction was allowed to progress for approximately five hours at a temperature of from 102° C. to 108° C., during which time 54 grams of water was collected. At the completion of the reaction, the crude product was neutralized by the addition of 31.4 grams of sodium hydroxide dissolved in 150 milliliters of water. The crude product was then washed twice with one-tenth volumes of water, after which 0.3 gram of hydroquinone was added. Toluene and heptane was removed from the crude product by flash evaporation under reduced pressure and a temperature of 50° C., and 460 grams of polyoxyethylene glycol-200 dimethacrylate subsequently obtained free of any polymeric material. The product had a color of 100 based upon platinum-cobalt color standards, and a specific gravity of 1.080 at 20/20° C. The yield of product calculated to be 91 percent, based upon the weight of the stabilized polyoxyethylene compound employed as a reactant.

Similar experiments were conducted in which commercially available polyoxyethylene glycol-200 was substituted for the stabilized product as a reactant. In one such experiment, 7 grams of 2,6-ditertiarybutyl-para-cresol was added to the esterification reaction mixture instead of hydroquinone, and in another, 7 grams of monobenzyl-para-aminophenol was similarly employed. Reaction conditions were otherwise essentially as described above in this example. In each of these experiments, considerable polymer formation was observed.

*Example II*

A 1650-gram sample of a stabilized polyoxyethylene glycol product having an average molecular weight of about 300 and incorporating approximately 0.17 gram of para-hydroxyanisole, such stabilized polyoxyethylene glycol having been obtained by the incorporation of the para-hydroxy-anisole in the crude polyoxyethylene glycol reaction product prior to the complete neutralization thereof at a pH of between about 7 and 8, was initially charged to a suitable reactor. To this charge 1680 grams of toluene, 720 grams of heptane, 51 grams of hydroquinone, 71 grams of sulfuric acid and 1047 grams of methacrylic acid were added in a manner similar to that described in Example I. The reaction mixture was refluxed for eight additional hours during which time 196 grams of water was collected. Upon completion of the esterification reaction, the crude reaction product was neutralized with 178 grams of sodium hydroxide dissolved in 1500 milliliters of water. The crude product was then washed twice with one-tenth volumes of water, and 0.2 gram of hydroquinone added thereto. The solvents or entraining agents were separated from the crude product by flash distillation under reduced pressure and a temperature of 50° C., and 2012 grams of polyoxyethylene glycol-300 dimethacrylate thereby obtained free of any polymeric material. The product had a color of 90 based upon platinum-cobalt color standard, a specific gravity of 1.090 at 20/20° C. and a refractive index of 1.4643 $n_D^{25}$. The yield of product calculated to be 91 percent, based upon the weight of the stabilized polyoxyethylene compound employed as a reactant.

*Example III*

Six hundred grams of a stabilized polyoxyethylene glycol product having an average molecular weight of about 600 and incorporating approximately 0.06 gram of 2,6-ditertiarybutyl-para-cresol such stabilized polyoxyethylene glycol having been obtained by the incorporation of the para-hydroxyanisole in the crude polyoxyethylene glycol reaction product prior to the complete neutralization thereof at a pH of between about 7 and 8, was initially charged to a suitable reactor. To this charge 680 grams of benzene, 0.7 gram of copper powder and 7 grams of sulfuric acid were added with agitation. The mixture was brought to reflux, and 108 grams of acrylic acid then added to the refluxing mixture over a period of about one hour with continued stirring. The esterification reaction was allowed to progress for four additional hours, during which time 26 grams of water was collected. Upon completion of the reaction, no polymer formation was observed. The crude reaction product was neutralized by the addition of 14 grams of sodium acetate, and then filtered to remove the solids. The solution of polyoxyethylene glycol-600 diacrylate in benzene had a color of 50 based upon platinum-cobalt color standards.

*Example IV*

Four hundred grams of a stabilized polyoxypropylene glycol product having an average molecular weight of about 1869, and incorporating approximately 0.04 gram of 2,6-ditertiarybutyl-para-cresol, was initially charged to a suitable reactor. The polyoxypropylene glycol product was produced by the condensation of propylene oxide with dipropylene glycol in the presence of a catalytic amount of potassium hydroxide and by the subsequent incorporation of the 2,6-ditertiarybutyl-para-cresol in the crude polyoxyethylene glycol reaction product prior to the complete neutralization thereof at a pH of between about 7 and 8. To the charge 708 grams of toluene, 303 grams of heptane, 9 grams of hydroquinone and 12.5 grams of sulfuric acid were added with agitation. The mixture was brought to reflux, and 41 grams of methacrylic acid then added to the refluxing mixture over a period of several hours with continued stirring. The esterification reaction was allowed to proceed until 8 grams of water of esterification had been collected. Upon neutralization of the crude polyoxypropylene glycol-1869 dimethacrylate product, substantially reduced polymer formation was observed.

*Example V*

Four hundred grams of a polyoxypropylene glycol monobutyl ether product having an average molecular weight of about 3,000 and incorporating approximately 0.04 gram of 2,6-ditertiarybutyl-para-cresol, was initially charged to a suitable reactor. The polyoxyethylene glycol product was produced by the condensation of propylene oxide with butanol in the presence of a catalytic amount of sodium hydroxide and by the subsequent incorporation of the 2,6-ditertiarybutyl-para-cresol in the crude polyoxyethylene glycol reaction product prior to the complete neutralization thereof at a pH of between about 7 and 8. To the charge 708 grams of toluene, 303 grams of heptane, 9 grams of hydroquinone and 12.5 grams of sulfuric acid were added with agitation. The mixture was brought to reflux, and 25 grams of methacrylic acid then added to the refluxing mixture over a period of several hours with continued stirring. The esterification reaction was allowed to proceed until 5 grams of water of esterification had been collected. Upon neutralization of the crude monofunctional ester product, substantially reduced polymer formation was observed.

This application is a continuation-in-part of co-pending application Serial No. 671,130, filed July 11, 1957.

What is claimed is:

1. In a process for the production of acrylic and methacrylic esters of polyoxyalkylene glycols and polyoxyalkylene glycol monoalkyl ethers by the esterification of an unsaturated compound selected from the group consisting of acrylic and methacrylic acids, acid anhydrides and acid halides thereof with a polyoxyalkylene compound selected from the group consisting of polyoxyalkylene glycols and polyoxyalkylene glycol monoalkyl ethers, the improvement which comprises employing as said polyoxyalkylene compound the stabilized product obtained by the steps of reacting a 1,2-alkylene oxide with a hydroxyl-containing compound selected from the group consisting of water, alkyl monohydroxy alcohols, alkylene glycols, dialkylene glycols and trialkylene glycols in the presence of an alkaline catalyst, adjusting the pH of the crude reaction product to within a range of from about 6 to 11, incorporating in said crude reaction product at a temperature up to about 150° C. and at a time not more than about one hour subsequent to any complete neutralization of said crude reaction product a stabilizing quantity of a phenolic compound corresponding to the formula:

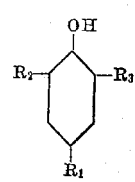

wherein $R_1$ is a member selected from the group consisting of hydrogen, alkyl, and alkoxy radicals, and $R_2$ and $R_3$ are members selected from the group consisting of hydrogen and alkyl radicals, at least one of which is an alkyl radical when $R_1$ is selected from the group consisting of hydrogen and alkyl radicals, and recovering the stabilized product thereby formed.

2. That improvement according to claim 1 wherein the phenolic compound is 2,6-ditertiarybutyl-para-cresol.

3. That improvement according to claim 1 wherein the phenolic compound is para-hydroxyanisole.

4. That improvement according to claim 1 wherein the phenolic compound is 2,6-ditertiarybutyl phenol.

5. That improvement according to claim 1 wherein the phenolic compound is 2-tertiarybutyl-para-cresol.

6. That improvement according to claim 1 wherein the phenolic compound is 2-butyl-para-hydroxy-anisole.

7. That improvement according to claim 1 wherein the phenolic compound is 2,6-dibutyl-para-hydroxyanisole.

References Cited in the file of this patent

UNITED STATES PATENTS

| | | |
|---|---|---|
| 2,815,369 | Holt | Dec. 3, 1957 |
| 2,942,033 | Leis et al. | June 21, 1960 |

FOREIGN PATENTS

| | | |
|---|---|---|
| 629,019 | Great Britain | Sept. 9, 1949 |